US012784923B2

(12) United States Patent
Kugelmass et al.

(10) Patent No.: US 12,784,923 B2
(45) Date of Patent: *Nov. 3, 2026

(54) SYSTEM FOR HEAT TRANSFER BETWEEN PRIMARY AND SECONDARY FLUID CIRCUITS WITHIN A DIFFUSION-BONDED PRESSURE VESSEL WALL FOR A NUCLEAR REACTOR

(71) Applicant: Last Energy Inc., Washington, DC (US)

(72) Inventors: Bret Kugelmass, Washington, DC (US); Charles Hodson Cole, Washington, DC (US)

(73) Assignee: Last Energy Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/301,579

(22) Filed: Aug. 15, 2025

(65) Prior Publication Data

US 2026/0038704 A1 Feb. 5, 2026

Related U.S. Application Data

(63) Continuation of application No. 18/921,964, filed on Oct. 21, 2024, now Pat. No. 12,412,674.

(Continued)

(51) Int. Cl.

| | |
|---|---|
| ***G21C 13/087*** | (2006.01) |
| ***G21C 11/08*** | (2006.01) |

(Continued)

(52) U.S. Cl.

CPC ........ *G21C 13/0875* (2013.01); *G21C 11/085* (2013.01); *G21C 11/088* (2013.01);

(Continued)

(58) Field of Classification Search

CPC ................ G21C 13/0875; G21C 15/12; G21C 11/088; G21C 11/085; G21C 13/0285;

(Continued)

(56) References Cited

U.S. PATENT DOCUMENTS

| | | | | | |
|---|---|---|---|---|---|
| 3,470,066 | A * | 9/1969 | Livsey | G21C 1/326 | 376/394 |
| 3,834,987 | A * | 9/1974 | Cook | G21C 15/02 | 376/295 |
| 3,846,795 | A * | 11/1974 | Jones | G21C 9/00 | 376/245 |
| 3,963,563 | A * | 6/1976 | Beine | G21C 13/00 | 376/287 |

(Continued)

OTHER PUBLICATIONS

Mizia, "Next generation nuclear plant intermediate heat exchanger acquisition strategy", No. INL/EXT-08-14054. Idaho National Lab (INL), Idaho Falls, ID (United States) 2008. (Year: 2008). (Year: 2008).*

(Continued)

*Primary Examiner* — Jack W Keith
*Assistant Examiner* — Daniel Wasil
(74) *Attorney, Agent, or Firm* — Run8 Patent Group, LLC; Peter Miller; Leah Raddatz

(57) ABSTRACT

A system includes a nuclear reactor pressure vessel comprising a heat exchange wall. An interior of the vessel contains nuclear fuel which heats a primary fluid. A primary fluid circuit extends vertically within the wall. The primary fluid circulates in a loop that includes the interior and the primary fluid circuit in the wall. A secondary fluid circuit also extends vertically within the wall, and is fluidly isolated from the primary fluid circuit. A secondary fluid circulates in a loop that includes a power generating system and the secondary fluid circuit in the wall. The wall acts as a heat exchanger in which thermal energy is transferred to the wall from primary fluid flowing through the primary fluid circuit, (Continued)

and then is transferred from the wall to secondary fluid flowing through the secondary fluid circuit.

1 Claim, 6 Drawing Sheets

Related U.S. Application Data

(60) Provisional application No. 63/545,044, filed on Oct. 20, 2023.

(51) Int. Cl.

| | |
|---|---|
| ***G21C 15/12*** | (2006.01) |
| *G21C 13/028* | (2006.01) |
| *G21C 15/04* | (2006.01) |
| *G21C 15/243* | (2006.01) |
| *G21C 15/26* | (2006.01) |

(52) U.S. Cl.
CPC ......... *G21C 15/12* (2013.01); *G21C 13/0285* (2013.01); *G21C 15/04* (2013.01); *G21C 15/243* (2013.01); *G21C 15/26* (2013.01)

(58) Field of Classification Search
CPC ...... G21C 15/04; G21C 15/243; G21C 15/26; G21C 13/087
USPC ................................ 376/293, 294, 295, 296
See application file for complete search history.

(56) References Cited

U.S. PATENT DOCUMENTS

| | | | | | |
|---|---|---|---|---|---|
| 3,996,099 | A * | 12/1976 | Faugeras | G21C 1/22 | 376/360 |
| 4,142,935 | A * | 3/1979 | Wade | G21C 13/073 | 376/460 |
| 4,243,484 | A * | 1/1981 | Tsuji | G21C 13/028 | 376/203 |
| 2016/0042816 | A1* | 2/2016 | Yi | G21C 9/004 | 376/283 |
| 2019/0096536 | A1* | 3/2019 | Arafat | G21C 5/12 | |
| 2020/0098483 | A1* | 3/2020 | Singh | G21C 13/04 | |

OTHER PUBLICATIONS

Harvego, "Evaluation of next generation nuclear power plant (NGNP) intermediate heat exchanger (IHX) operating conditions", No. INL/EXT-06-11109. Idaho National Lab (INL), Idaho Falls, ID (United States) 2006. (Year: 2006). (Year: 2006).*
Kaiser, Partially Enriched Uranium Nuclear Power, "Gas Cooled Power Reactor", IDO-2024 (1958). (Year: 1958). (Year: 1958).*
Hayner, "Next Generation Nuclear Plant Materials Research and Development Program Plan", INL/EXT-05-00758, Idaho National Lab.(INL), United States, 2005. (Year: 2005). (Year: 2005).*

* cited by examiner

SYSTEM FOR HEAT TRANSFER BETWEEN PRIMARY AND SECONDARY FLUID CIRCUITS WITHIN A DIFFUSION-BONDED PRESSURE VESSEL WALL FOR A NUCLEAR REACTOR

CROSS-REFERENCE TO RELATED APPLICATIONS

This application is a continuation of U.S. patent application Ser. No. 18/921,964, filed on 21 Oct. 2024, which claims the benefit of U.S. Provisional Application No. 63/545,044 filed on 20 Oct. 2023, which is incorporated in its entirety by this reference.

This application is related to U.S. patent application Ser. No. 18/756,611, filed on 27 Jun. 2024, which is incorporated in its entirety by this reference.

TECHNICAL FIELD

This invention relates generally to the field of nuclear reactors and more specifically to a new and useful heat exchanging pressure vessel in the field of nuclear reactors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
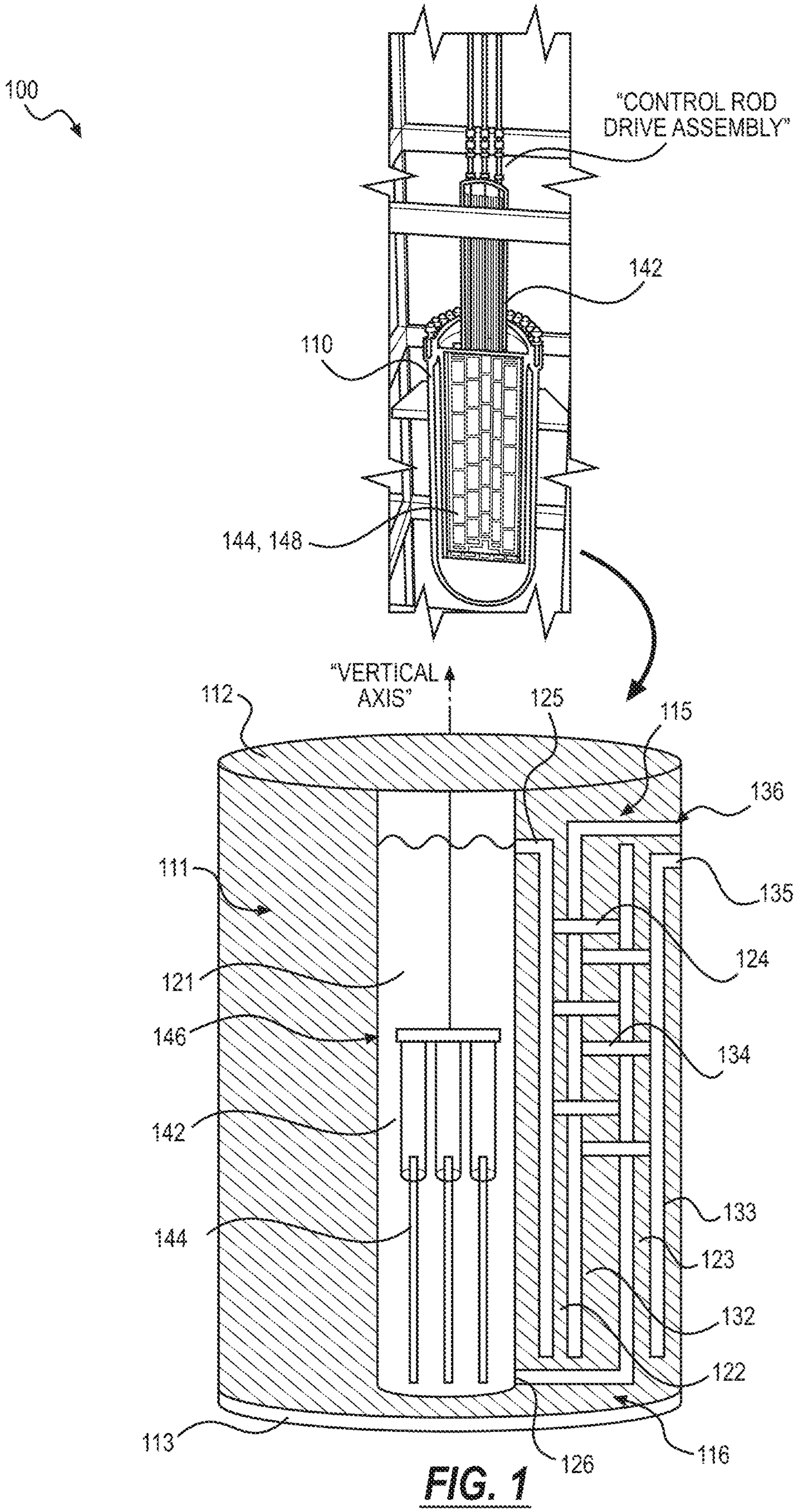
FIG. 1 is a schematic representation of one variation of the system.

As shown in FIG. 1, a system 100 includes: a pressure vessel 110; a nuclear fuel 144; a primary working fluid 121; and a secondary working fluid 131.

The pressure vessel 110: includes a wall 111; defines a primary working fluid circuit 120 extending vertically within the wall 111; and defines a secondary working fluid circuit 130 extending vertically within the wall 111. The secondary working fluid circuit 130 is adjacent and fluidly isolated from the primary working fluid circuit 120. The nuclear fuel 144 is arranged within the pressure vessel 110. The primary working fluid 121 is encased within the pressure vessel 110 and circulates between the nuclear fuel 144 and the primary working fluid circuit 120 within the wall 111 of the pressure vessel 110. The secondary working fluid 131 circulates between the secondary working fluid circuit 130, within the wall 111 of the pressure vessel 110, and an external power generation system.

The wall 111 of the pressure vessel 110 further: defines a heat exchanger configured to transfer thermal energy from the primary working fluid 121 flowing through the primary working fluid circuit 120 into the secondary working fluid 131 flowing through the secondary working fluid circuit 130; encapsulates the nuclear fuel 144 and the primary working fluid 121; and defines a radiation shield configured to attenuate radiation emitted by the nuclear fuel 144.

1.1 Variation: Isolated+Sealed Coolant Circuits

In one variation, the pressure vessel 110 includes a wall 111 and defines: a primary working fluid circuit 120 extending vertically within the wall 111; a secondary working fluid circuit 130 extending vertically within the wall 111 and adjacent and fluidly isolated from the primary working fluid circuit 120; an upper cap 112 coupled to and arranged about a circumference of the wall 111; and a lower cap 113 coupled to the wall 111 opposite the upper cap 112 and configured to cooperate with the upper cap 112 to seal the primary working fluid circuit 120 and the secondary working fluid circuit 130. The pressure vessel 110 is configured to store a nuclear fuel 144, a primary working fluid 121, and a secondary working fluid 131. The wall 111 further: defines a heat exchanger configured to transfer thermal energy from the primary working fluid 121 flowing through the primary working fluid circuit 120 into the secondary working fluid 131 flowing through the secondary working fluid circuit 130; and defines a radiation shield configured to attenuate radiation emitted by the nuclear fuel 144.

1.2 Variation: Heat Exchanger+Radiation Shield

In one variation, a nuclear reactor pressure vessel 110 includes a wall 111 and defines: a primary working fluid circuit 120 extending vertically within the wall 111; and a secondary working fluid circuit 130 extending vertically within the wall 111 and adjacent and fluidly isolated from the primary working fluid circuit 120. The pressure vessel 110 is configured to store a nuclear fuel 144, a primary working fluid 121, and a secondary working fluid 131.

The wall 111 of the pressure vessel 110 further: defines a heat exchanger configured to transfer thermal energy from the primary working fluid 121 flowing through the primary working fluid circuit 120 into the secondary working fluid 131 flowing through the secondary working fluid circuit 130; and defines a radiation shield configured to attenuate radiation emitted by the nuclear fuel 144.

2. Applications

Generally, the system 100 includes: a nuclear reactor 140; a pressure vessel 110; and two isolated working fluid circuits 120, 130 (e.g., coolant circuits, coolant loops). The pressure vessel 110 is characterized by a unitary, metallic rigid structure that includes a continuous wall 111 that defines an inner surface and an outer surface. The inner surface bounds an internal volume 114 that houses the nuclear reactor 140. The pressure vessel 110 also defines: a primary working fluid circuit 120 (or "primary coolant circuit") extending vertically within the wall 111; and a secondary working fluid circuit 130 (or "secondary coolant circuit") extending vertically in the wall 111, adjacent and fluidly isolated from the primary working fluid circuit 120, and coupled to a heat sink, turbine, thermoelectric generator, or other external thermal power generation system.

In particular, the system 100: cycles a primary working fluid 121 (e.g., water) between the nuclear fuel 144 and the primary working fluid circuit 120 within the wall 111; transfers thermal energy from the primary working fluid 121 into the wall 111 of the pressure vessel 110; distributes this thermal energy from the wall 111 of the pressure vessel 110 into the secondary working fluid 131 flowing through the secondary working fluid circuit 130; and cycles the secondary working fluid 131—thus heated by the primary working fluid 121 and the wall 111 of the pressure vessel 110—to an external thermal power generation system.

For example, the pressure vessel 110 can include a unitary metallic structure formed via diffusion bonding of laser-cut, photo-chemically etched, water-jet cut, or punched metallic plates such as stainless steel, aluminum, or iron layers. Each plate defines channel profiles including two-dimensional (or "2.5D") vertical channel segments. In this example, the pressure vessel 110 defines an eight-foot-diameter outer surface, including a wall 111 thickness of two feet and an inner surface diameter of four feet; and defines a length of forty feet. The pressure vessel 110 can be: arranged vertically; partially or fully submersed (or "buried") in earth; and fluidly coupled (i.e., supply heated secondary coolant 131) to an external thermal power generation system arranged above-grade.

Therefore, the wall 111 of the pressure vessel 110 functions as a heat exchanger that transfers thermal energy from the primary working fluid 121 flowing through the primary working fluid circuit 120 into the secondary working fluid 131 flowing through the secondary working fluid circuit 130. Additionally, the pressure vessel 110: isolates the primary working fluid 121—which contacts or flows near the nuclear fuel 144 in the nuclear reactor 140 and through the primary working fluid circuit 120—from the secondary working fluid 131 flowing through the secondary working fluid circuit 130; and transfers thermal energy from the primary working fluid 121 into the secondary working fluid 131. The pressure vessel 110 also functions: to contain the nuclear reactor 140; to contain primary and secondary working fluids 131 under elevated pressures and temperatures (e.g., 600 psi, 400° F.); to prevent loss of containment of nuclear fuel 144 and the primary working fluid 121; to shield external structures from radiation emitted by the nuclear fuel 144 during operation; and to prevent ingress of debris.

The pressure vessel 110 can further define a large thermal mass relative to thermal output of the nuclear reactor 140. Accordingly, the pressure vessel 110 can function as a thermal battery that stores thermal energy generated by the nuclear reactor 140 during operation, thereby: maintaining constant, near-steady-state (e.g., operating) pressure and temperature of the secondary working fluid 131 exiting the pressure vessel 110 during operation; and decoupling output pressure and temperature of the secondary working fluid 131 from a fission rate of the nuclear reactor 140.

2.1 Working Fluid Circuits

The primary working fluid circuit 120 contains a primary working fluid 121 (e.g., water) sealed within the pressure vessel 110 that contacts the nuclear fuel 144 and absorbs thermal energy from a fission reaction of the nuclear fuel 144. The primary working fluid 121 flows through the primary working fluid circuit 120: from the internal volume 114; to the inner surface of the wall 111; to the outer surface of the wall 111; and back into the internal volume 114 to release thermal energy into the wall 111 of the pressure vessel 110.

The secondary working fluid circuit 130 contains a secondary working fluid 131 (e.g., supply water, liquid salt). The secondary working fluid 131 flows through the secondary working fluid circuit 130: from the external power generation system; to the outer surface of the wall 111; to the inner surface of the wall 111; out of the pressure vessel 110 via the inner surface; and to an external thermal power generation system for conversion of thermal energy into electricity.

2.2 Heat Exchanger

The pressure vessel 110 is configured to: contain a high-pressure sealed internal volume 114; and exchange thermal energy between the primary and secondary working fluids 121, 131 to maintain a steady-state temperature condition. For example, the nuclear reactor 140 within the pressure vessel 110 converts nuclear energy into thermal energy, thereby heating the internal volume 114. The primary working fluid 121: flows along (or near) the nuclear fuel 144; absorbs thermal energy from the fission reaction of the nuclear fuel 144; and evenly distributes the thermal energy into the wall 111 of the pressure vessel 110.

The secondary working fluid 131 enters the pressure vessel 110 from the external power generation system occupying a temperature (e.g., 100° C.) lower than a temperature of the primary working fluid 121 (e.g., up to 350° C.) to cool the pressure vessel 110. The secondary working fluid 131: flows within the wall 111 of the pressure vessel 110 through the secondary working fluid circuit 130 isolated from the primary working fluid circuit 120; absorbs thermal energy from the wall 111 of the pressure vessel 110; and flows out of the pressure vessel 110 to an external thermal power generation system. Therefore, the wall 111 of the pressure vessel 110 functions as a heat exchanger to transfer thermal energy from the primary working fluid 121 into the secondary working fluid 131. The secondary working fluid 131 then transports the thermal energy to an external thermal power generation system for conversion into mechanical or electrical energy.

Alternatively, the secondary working fluid 131 can function as a heat source by collecting thermal energy from the primary working fluid 121 and transporting the thermal energy to an external heat sink for transformation into mechanical, chemical, or electrical energy.

2.3 Radiation Shield

Furthermore, the pressure vessel 110 can define a thick-walled (e.g., 24 inches thick) geometry that functions as a nuclear shield to seal radiation-such as alpha particles, beta particles, neutrons, and gamma rays-within the pressure vessel 110. The primary and secondary working fluids 121, 131 additionally absorb and/or slow neutrons to prevent radiation from escaping into the external environment around the pressure vessel 110.

2.4 Diffusion-bonded Structure

The pressure vessel 110 defines a monolithic structure manufactured via diffusion bonding of a set of metallic plates (e.g., layers, sheets). The diffusion bonding process: results in cross-boundary crystalline growth of metal grains in adjacent metallic plates; causes diffusion of each metallic plate into an adjacent metallic plate; and blends materials boundaries between these metallic plates to form bonds. Thus, by diffusion bonding the set of metallic plates to form the pressure vessel 110, the pressure vessel 110 can exhibit a high strength and therefore contain a high pressure (e.g., 10,000 psi) system.

Furthermore, by separately manufacturing each metallic plate prior to diffusion bonding, the pressure vessel 110 can exhibit complex working fluid circuits 120, 130 within the wall 111 in order to distribute thermal energy about the pressure vessel 110.

3. Hierarchy and Terms

A "primary working fluid circuit" or "primary coolant circuit" is referred to herein as a primary coolant loop including one or more primary channels such as: a set of inner primary vertical channels; a set of outer primary vertical channels; a set of primary lateral channels fluidly coupling the inner primary vertical channels and the outer primary vertical channels; a set of primary fluid inlets fluidly coupled to the set of inner primary vertical channels; and a set of primary fluid outlets fluidly coupled to the set of outer primary vertical channels.

A "primary vertical channel" is referred to herein as a vertical conduit (e.g., pathway) for conveying a primary working fluid or primary coolant (e.g., water) within the primary working fluid circuit. A "primary lateral channel" is referred to herein as a lateral conduit (e.g., pathway) that fluidly couples the inner and outer vertical primary channels.

A "secondary working fluid circuit" or "secondary coolant circuit" is referred to herein as a secondary (or intermediate) coolant loop including one or more secondary channels such as: a set of inner secondary vertical channels; a set of outer secondary vertical channels; a set of secondary lateral channels fluidly coupling the inner secondary vertical channels and the outer secondary vertical channels; a set of secondary fluid inlets fluidly coupled to the set of outer secondary vertical channels; and a set of secondary fluid outlets fluidly coupled to the set of inner secondary vertical channels.

A "secondary vertical channel" is referred to herein as a vertical conduit (e.g., pathway) for conveying a secondary working fluid or secondary coolant (e.g., water) within the secondary working fluid circuit. A "secondary lateral channel" is referred to herein as a lateral conduit (e.g., pathway) that fluidly couples the inner and outer vertical secondary channels.

4. Pressure Vessel

In one implementation, the pressure vessel 110, shown in FIG. 1, includes a wall 111 enclosing an internal volume 114. The wall 111 defines: an inner surface bounding the internal volume 114; and an outer surface. The pressure vessel 110 can additionally define a heat exchanger region within the wall 111 located between the inner and outer surfaces. The internal volume 114 defines a sealed cavity configured to contain: a nuclear reactor 140 (e.g., a nuclear core containing nuclear fuel 144); and a volume of primary working fluid 121 (hereinafter "primary coolant") (e.g., water). The inner surface defines: a primary inlet 125 configured to direct primary coolant 121 into the pressure vessel 110 between the inner surface and the outer surface; and a primary outlet 126 configured to direct primary coolant 121 from the inner surface into the internal volume 114. The outer surface defines: a secondary inlet 135 configured to direct secondary working fluid 131 (hereinafter "secondary coolant") into the pressure vessel 110 between the inner and outer surfaces; and a secondary outlet 136 configured to direct secondary coolant 131 out of the outer surface and to an external thermal power generation system for conversion of the thermal energy into electricity.

In one variation, the pressure vessel 110 defines a cylindrical geometry defining: an inner surface characterized by an inner diameter; and an outer surface characterized by an outer diameter larger than the inner diameter. The pressure vessel 110 can additionally include an upper cap 112 and a lower cap 113 configured to seal the internal volume 114 bounded by the inner surface.

For example, the pressure vessel 110 can define a cylindrical geometry including a 24-inch-thick continuous wall 111 and a 48-inch inner diameter. In this example, the internal volume 114 is characterized by a 48-inch inner diameter, and the outer surface is characterized by a 96-inch outer diameter. The pressure vessel 110 can: define a length between 20 and 40 feet; contain pressures up to 10,000 psi within the internal volume 114; and define a total density of the wall 111 between 30% and 70%. In this example, the primary and secondary coolant circuits 130 are located within the 24-inch-thick wall 111 defining the heat exchanger region of the pressure vessel 110. The pressure vessel 110 can further include a corrosion resistant material such as stainless steel.

Figure 3A:
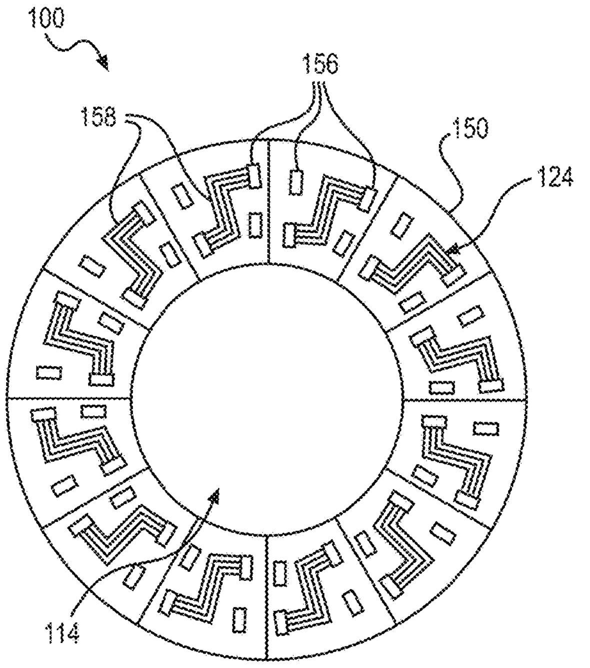
FIGS. 3A, 3B, and 3C are schematic representations of one variation of the system.
Figure 3B:
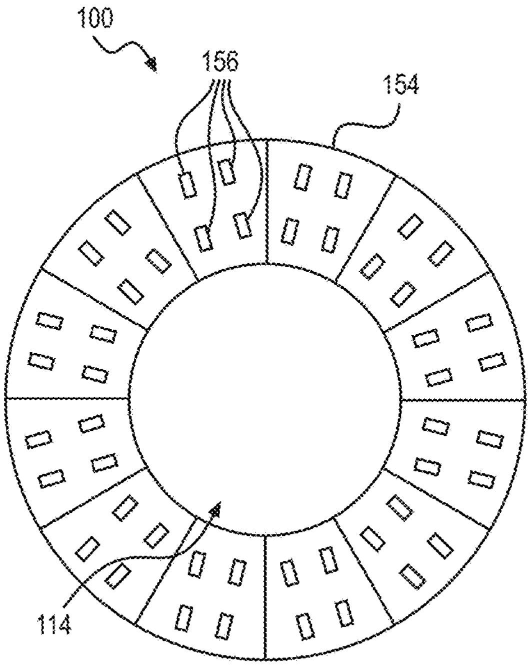
Figure 3C:
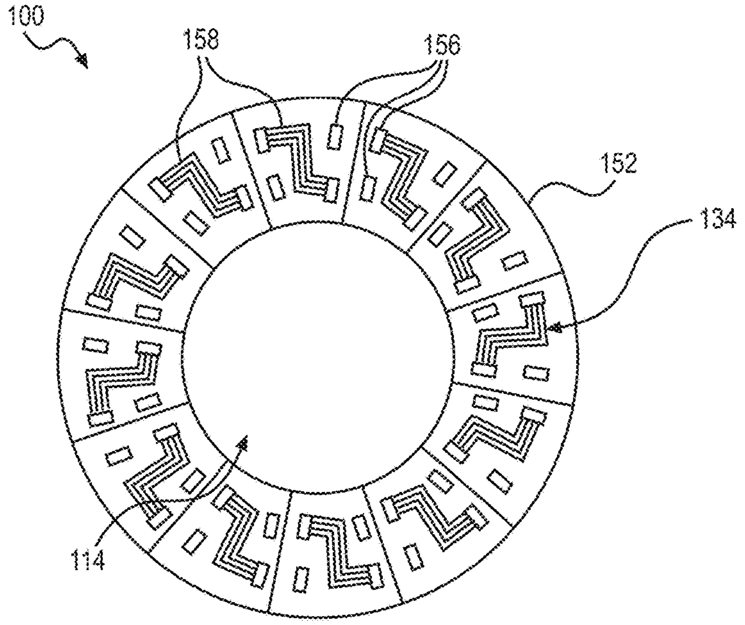

Furthermore, the pressure vessel 110 includes a set of metallic plates assembled via diffusion-bonding to define: the internal volume 114; the primary coolant circuit 120; and the secondary coolant circuit 130. The set of metallic plates can define a stack of annuli, as shown in FIGS. 3A, 3B, and 3C, to form a cylindrical pressure vessel 110. Each metallic plate can diffusion-bond to an adjacent metallic plate to form a monolithic pressure vessel 110 defining complex interior pathways for flow of primary and secondary coolants 121, 131, as further described below.

4.1 Primary Coolant Circuit

Generally, the pressure vessel 110 includes a primary coolant circuit 120 configured to circulate the primary coolant 121 (e.g., water). The pressure vessel 110 seals the primary coolant 121 within the internal volume 114 enclosed by the wall 111. Therefore, the primary coolant circuit 120 is isolated from the secondary coolant circuit 130 to prevent the primary coolant 121 from interfacing (e.g., mixing) with the secondary coolant 131.

The primary coolant 121 includes water configured to: moderate the fission reaction of the nuclear fuel 144; and absorb thermal energy (e.g., heat) from the nuclear fuel 144 to cool the nuclear fuel 144. The primary coolant 121 is further sealed within the pressure vessel 110 and configured to: circulate through the inner and outer primary vertical channels 122, 123 and across the set of primary lateral channels 124; and distribute thermal energy, output by the nuclear fuel 144 via a fission reaction, into the wall 111 of the pressure vessel 110. However, the primary coolant 121 can include another non-corrosive and thermally conductive fluid to cool the nuclear fuel 144 and distribute thermal energy throughout the pressure vessel 110.

In one implementation, the primary coolant 121 fills the internal volume 114 of the pressure vessel 110, and the primary coolant circuit 120 therefore includes the internal volume 114 of the pressure vessel 110. Alternatively, the internal volume 114: is partially filled with primary coolant 121; and includes a volume of compressible gas (e.g., steam) configured to maintain a near-constant pressure within the pressure vessel 110.

In another implementation, the primary coolant circuit 120 includes a conduit arranged within the internal volume 114 and proximal the nuclear fuel 144 to cool the nuclear fuel 144 without contacting the nuclear fuel 144 with the primary coolant 121. In this implementation, the portion of the primary coolant circuit 120 within the internal volume 114 fluidly connects to the primary inlet 125 and the primary outlet 126 of the inner surface.

4.1.1 Primary Channel Geometry

In one implementation, the primary coolant circuit 120 includes: an array of primary inlets 125; an array of inner primary vertical channels 122; an array of outer primary vertical channels 123; a set of primary lateral channels 124; and an array of primary outlets 126. A primary inlet 125 in the array of primary inlets 125 defines an orifice in the inner surface to direct primary coolant 121 into the wall 111 of the pressure vessel 110. Each inner primary vertical channel 122 in the array of inner primary vertical channels 122 defines a conduit (e.g., pathway) to transport the primary coolant 121:

arranged proximal the inner surface of the wall 111; arranged parallel to and laterally offset from a vertical axis of the pressure vessel 110; and fluidly coupled to a primary inlet 125 in the array of primary inlets 125.

Each outer primary vertical channel 123 in the array of outer primary vertical channels 123 defines a conduit (e.g., pathway) to transport the primary coolant 121: arranged proximal the outer surface of the wall 111; arranged parallel to and laterally offset from the vertical axis of the pressure vessel 110; and fluidly coupled to a primary outlet 126 in the array of primary outlets 126. The set of primary lateral channels 124: extends between an inner primary vertical channel 122 in the array of inner primary vertical channels 122 and an outer primary vertical channel 123 in the array of outer primary vertical channels 123; is arranged orthogonal to the inner primary vertical channel 122 and the outer primary vertical channel 123; and fluidly couples the inner primary vertical channel 122 to the outer primary vertical channel 123. A primary outlet 126 in the array of primary outlets 126 defines an orifice in the inner surface of the pressure vessel 110 to direct primary coolant 121 into the internal volume 114.

4.1.1.1 Primary Vertical Channel Geometry

In one variation, each inner primary vertical channel 122 in the array of inner primary vertical channels 122 is radially offset about a vertical axis of the pressure vessel 110 by a radial offset pitch distance. In one example, the pressure vessel 110 can include 12 inner primary vertical channels 122 such that each inner primary vertical channel 122 is radially offset by 30 degrees from adjacent inner primary vertical channels 122. The array of outer primary vertical channels 123 is arranged laterally offset from the inner primary vertical channels 122 such that the array of outer primary vertical channels 123 is proximal the outer surface of the wall 111 and the array of inner primary vertical channels 122 are proximal the inner surface of the wall 111.

In another example, a portion of the wall 111 of the pressure vessel 110 can define: an inner primary vertical channel 122 offset from the vertical axis of the pressure vessel 110 by a first distance; and an outer primary vertical channel 123 arranged offset from the vertical axis by a second distance greater than the first distance. Thus, the inner and outer primary vertical channels 122, 123 are radially arranged throughout the wall 111 to evenly distribute thermal energy from the primary coolant 121 throughout the pressure vessel 110.

4.1.1.2 Primary Lateral Channel Geometry

In one variation, each primary lateral channel 124 in the set of primary lateral channels 124 is: interposed between an inner primary vertical channel 122 and an outer primary vertical channel 123; and offset from each other adjacent primary lateral channel 124 by an axial pitch distance. For example, the pressure vessel 110 can include a 20-foot-long inner primary vertical channel 122 and a 20-foot-long outer primary vertical channel 123. The set of primary lateral channels 124 can define a six-inch axial pitch distance between each primary lateral channel 124 in the set of primary lateral channels 124 such that each primary lateral channel 124 extends between the inner and outer primary vertical channels 122, 123 every six inches (e.g., half foot). Therefore, the primary coolant 121 can flow across a primary lateral channel 124 of the set of primary lateral channels 124 distributed axially between the inner primary vertical channel 122 and the outer primary vertical channel 123.

4.1.2 Primary Inlets+Outlets

In one implementation, the primary coolant circuit 120 includes an array of primary inlets 125 and an array of primary outlets 126. The array of primary inlets 125 is configured to direct the primary coolant 121 from the internal volume 114 into the primary coolant circuit 120. The array of primary outlets 126 is configured to return the primary coolant 121 from the primary coolant circuit 120 toward the nuclear fuel 144. Further, each primary inlet 125 in the array of primary inlets 125 is configured to receive the primary coolant 121, exiting the internal volume 114 and inbound to the primary coolant circuit 120, and supply the primary coolant 121 into the primary coolant circuit 120. Each primary outlet 126 in the array of primary outlets 126 is configured to return the primary coolant 121 from the primary coolant circuit 120 toward the nuclear fuel 144.

In one variation, the primary inlet 125 is arranged within an upper region 115 of the pressure vessel 110 and the primary outlet 126 is arranged within a lower region 116 of the pressure vessel 110. The primary coolant circuit 120 directs primary coolant 121: from the internal volume 114 into the primary inlet 125; down the inner primary vertical channel 122; across the set of primary lateral channels 124; down the inner primary vertical channel 122; and back into the internal volume 114 via the primary outlet 126. Thus, the primary inlet 125 and the primary outlet 126 are arranged to exploit natural convection.

For example, heated primary coolant 121—characterized by a first temperature (e.g., 300° C.)—enters through the primary inlet 125 (e.g., at a top of the pressure vessel 110). The primary coolant 121 then distributes thermal energy, absorbed from the nuclear fuel 144, into the heat exchanger region of the pressure vessel 110. Cooled primary coolant 121 characterized by a second temperature (e.g., 250° C.) less than the first temperature sinks downward toward the primary outlet 126 (e.g., at a base of the pressure vessel 110) and through the primary outlet 126 back into the internal volume 114 proximal the nuclear fuel 144. Thus, the primary inlet 125 and the primary outlet 126 are arranged on the pressure vessel 110 to enable the primary coolant 121 to passively flow through the primary coolant circuit 120 via natural convection.

Accordingly, the primary coolant circuit 120 is configured to direct heated (e.g., 300° C.) primary coolant 121: from the internal volume 114 into the primary inlet 125; through the inner primary vertical channel 122; across a set of primary lateral channels 124; and through the outer primary vertical channel 123. Within the heat exchanger region between the inner and outer surfaces of the wall 111 of the pressure vessel 110, the primary coolant 121 releases thermal energy to the pressure vessel 110 and therefore the primary coolant 121 decreases in temperature. The primary coolant circuit 120 further directs cooled primary coolant 121 (e.g., 250° C.): from the outer primary vertical channel 123; to the primary outlet 126; and back into the internal volume 114 to cool the nuclear fuel 144. Therefore, the primary coolant circuit 120 transports primary coolant 121 through the heat exchanger region of the pressure vessel 110 to distribute thermal energy into the heat exchanger region (e.g., the wall 111 of the pressure vessel 110), decrease a temperature of the primary coolant 121 flowing through the primary coolant circuit 120, and cool the nuclear fuel 144.

In another variation, the primary coolant circuit 120 is configured to direct each portion of primary coolant 121 along a path through the primary coolant circuit 120 defining an approximately (e.g., within 1%) constant length. The primary coolant circuit 120 directs a portion of primary coolant 121: from an inner primary vertical channel 122; and to an outer primary vertical channel 123 via any channel of a set of primary lateral channels 124 extending between the inner primary vertical channel 122 and the outer primary vertical channel 123.

For example, the primary coolant circuit 120 directs a first portion of primary coolant 121: one foot down the inner primary vertical channel 122; two feet across a first primary lateral channel 124 located one foot offset down the inner primary vertical channel 122; and 19 feet down the outer primary vertical channel 123 to reach the primary outlet 126 for a total path length of 22 feet. The primary coolant circuit 120 directs a second portion of primary coolant 121: 14 feet down the inner primary vertical channel 122; two feet across a second primary lateral channel 124 located offset 14 feet down the inner primary vertical channel 122; and six feet down the outer primary vertical channel 123 to reach the primary outlet 126 defining a total path length of 22 feet. In this example, while the first portion of primary coolant 121 flows across a first primary lateral channel 124 and the second portion flows across a second primary lateral channel 124, both the first portion and the second portion of primary coolant 121 complete a 22-foot total path length through the primary coolant circuit 120. Therefore the constant path length for each portion of primary coolant 121 ensures that each portion of flow remains within the primary coolant circuit 120 for approximately the same length of time and therefore exchanges approximately the same amount of thermal energy with the pressure vessel 110.

4.2 Secondary Coolant Circuit

Generally, the pressure vessel 110 includes a secondary coolant circuit 130 configured to circulate a secondary coolant 131 (e.g., water, salt). The secondary coolant circuit 130 directs the secondary coolant 131 within the heat exchanger region of the wall 111 to absorb thermal energy from the pressure vessel 110. In particular, the secondary coolant circuit 130 originates and terminates at an external thermal power generation system. Alternatively, the secondary coolant circuit 130 can: originate at a working fluid reservoir (or "coolant reservoir") external to the pressure vessel 110; and terminate at an external thermal power generation system. The secondary coolant circuit 130 can thus define a recycling loop that directs cooled secondary coolant 131 out of the external thermal power generation system and back into the coolant reservoir. Additionally, the secondary coolant circuit 130 can: originate at a coolant reservoir external to the pressure vessel 110; and terminate at an external heat sink. Thus, the secondary coolant circuit 130 can additionally define a recycling loop that directs cooled secondary coolant 131 from the heat sink and back into the coolant reservoir.

The secondary coolant 131 can include a fluid configured to absorb and retain thermal energy. The secondary coolant 131 can include a fluid characterized by a high heat capacity and thermal conductivity such as: water, liquid salt, oil, or liquid metal. In one example, the secondary coolant 131 includes salt configured to: absorb thermal energy transferred from the primary coolant 121 by the heat exchanger region of the wall 111; and transport thermal energy to the external thermal power generation system.

4.2.1 Secondary Channel Geometry

In one implementation, the secondary coolant circuit 130 includes: an array of secondary inlets 135, an array of inner secondary vertical channels 132; an array of outer secondary vertical channels 133; a set of secondary lateral channels 134; and an array of secondary outlets 136. A secondary inlet 135 in the array of secondary inlets 135 defines an orifice in the outer surface to direct secondary coolant 131 into the continuous wall 111 of the pressure vessel 110. An inner secondary vertical channel 132 in the array of inner secondary vertical channels 132 defines a conduit to transport secondary coolant 131: arranged proximal the inner surface, parallel to and laterally offset from a vertical axis of the pressure vessel 110; and fluidly connected to the secondary inlet 135. An outer secondary vertical channel 133 in the array of outer secondary vertical channels 133 defines a conduit to transport secondary coolant 131: arranged proximal the outer surface of the pressure vessel 110, parallel to and laterally offset from the vertical axis of the pressure vessel 110; and fluidly coupled to the secondary outlet 136.

The set of secondary lateral channels 134: extend between an inner secondary vertical channel 132 in the array of inner secondary vertical channels 132 and an outer secondary vertical channel 133 in the array of outer secondary vertical channels 133; is arranged orthogonal to the inner secondary vertical channel 132 and the outer secondary vertical channel 133; and fluidly couples the inner secondary vertical channel 132 to the outer secondary vertical channel 133. A secondary outlet 136 in the array of secondary outlets 136 defines an orifice in the outer surface of the pressure vessel 110 to direct secondary coolant 131 into the internal volume 114.

4.2.1.1 Secondary Vertical Channel Geometry

In one variation, each inner secondary vertical channel 132 in the array of inner secondary vertical channels 132 is radially offset from an adjacent inner secondary vertical channel 132 by a radial pitch distance corresponding to the radial offset pitch distance of the array of inner primary vertical channels 122 in the primary coolant circuit 120. For example, the primary coolant circuit 120 can include a first quantity of inner and outer primary vertical channels 122, 123 and a second quantity of inner and outer secondary vertical channels 132, 133, approximating (e.g., equivalent to, corresponding to, matching) the first quantity, to enable the secondary coolant 131 to absorb a first proportion of thermal energy produced by the nuclear reactor 140 from the wall 111 and out of the pressure vessel 110.

Alternatively, the array of inner secondary vertical channels 132 defines a radial offset pitch distance different from the radial offset pitch distance of the array of inner primary vertical channels 122. For example, the wall 111 can include a first quantity of inner and outer primary vertical channels 122, 123 and a second quantity of inner and outer secondary vertical channels 132, 133, greater than the first quantity, to enable the secondary coolant 131 to absorb a second proportion, greater than the first proportion, of thermal energy produced by the nuclear reactor 140 from the wall 111 and out of the pressure vessel 110. Therefore, the array of secondary conduits can define a lower pitch offset than the array of primary conduit. The array of outer secondary vertical channels 133 is laterally offset from the array of inner secondary vertical channels 132 such that the array of inner secondary vertical channels 132 is arranged proximal the inner surface and the array of outer secondary vertical channels 133 is arranged proximal the outer surface.

Furthermore, the array of inner secondary vertical channels 132 is radially offset from the array of inner primary vertical channels 122. For example, each inner secondary vertical channel 132 is interposed between a set of (e.g., two) inner primary vertical channels 122 and each outer secondary vertical channel 133 is interposed between a set of (e.g., two) outer primary vertical channels 123. Therefore, the inner and outer secondary vertical channels 132, 133 are radially distributed throughout the wall 111 to enable the secondary coolant 131 to absorb and distribute thermal energy out of the pressure vessel 110.

4.2.1.2 Secondary Lateral Channel Geometry

In one variation, each secondary lateral channel 134 in the set of secondary lateral channels 134 is: interposed between an inner secondary vertical channel 132 and an outer secondary vertical channel 133; and offset from each other adjacent secondary lateral channel 134 by an axial pitch distance. Each secondary lateral channel 134 can further define an axial pitch distance corresponding to (e.g., matching) the axial pitch distance of the primary lateral channels 124. For example, the secondary lateral channels 134 can define a one-inch axial pitch distance between each secondary lateral channel 134 in the set of secondary lateral channels 134. The primary lateral channels 124 can define a one-inch axial pitch distance between each primary lateral channel 124 in the set of primary lateral channels 124. Thus, the secondary lateral channels 134 are axially interposed between the primary lateral channels 124 and can absorb thermal energy released into the wall 111 of the pressure vessel 110 by the set of primary lateral channels 124.

In another variation, the set of primary lateral channels 124 define a first width, and the set of secondary lateral channels 134 define a second width greater than the first width. For example, the set of primary lateral channels 124 can exhibit a one-half-millimeter width, and the set of secondary lateral channels 134 can exhibit a one-millimeter width. In this example, the secondary coolant 131 flowing through the secondary lateral channels 134 exhibit a lower head loss than the primary coolant 121 flowing through the primary lateral channels 124. Therefore, the secondary coolant circuit 130 can exhibit less pressure drop than the primary coolant circuit 120.

4.2.2 Secondary Inlets+Outlets

In one implementation, the secondary coolant circuit 130 includes an array of secondary inlets 135 and an array of secondary outlets 136. The array of secondary outlets 136 is configured to cooperate with the array of primary inlets 125, the array of primary outlets 126, and the array of secondary inlets 135 to maintain pressures within the pressure vessel 110 within an operating pressure range. Further, each secondary inlet 135 in the array of secondary inlets 135 is configured to receive the secondary coolant 131 from the external thermal power generation system and supply the secondary coolant 131 into the secondary coolant circuit 130. Each secondary outlet 136 in the array of secondary outlets 136 is configured to: return the secondary coolant 131 from the secondary coolant circuit 130 to the external power generation system for conversion of thermal energy, absorbed by the primary coolant 121 from the nuclear fuel 144 and transferred to the secondary coolant 131 via the wall 111, into electricity; and cooperate with the primary inlet 125, the primary outlet 126, and the secondary inlet 135 to maintain pressures within the pressure vessel 110 within an operating pressure range.

In one variation, the secondary inlet 135 and the secondary outlet 136 are arranged within an upper region 115 of the outer surface of the wall 111 of the pressure vessel 110. The secondary coolant circuit 130 directs the secondary coolant 131: into the secondary inlet 135; down the outer secondary vertical channel 133; across the set of secondary lateral channels 134; down the inner secondary vertical channel 132; and out of the secondary outlet 136. The secondary lateral channel 134 can additionally include an exit conduit configured to direct secondary coolant 131 from a lower region 116 of the pressure vessel 110 at the end of the inner secondary vertical channel 132 to an upper region 115 of the pressure vessel 110 to exit through the outer surface of the wall 111 via the secondary outlet 136. The secondary outlet 136 is arranged to exploit natural convection.

For example, the secondary coolant 131—characterized by a first temperature (e.g., 150° C.)—enters through the secondary inlet 135 (e.g., at a top of the pressure vessel 110) and sinks downward. The secondary coolant 131 then absorbs heat from the pressure vessel 110 and is characterized by a second temperature (e.g., 250° C.) greater than the first temperature. The secondary coolant 131 then rises upward toward the secondary outlet 136 (e.g., at the top of the pressure vessel 110). Thus, the secondary inlet 135 and the secondary outlet 136 are arranged on the pressure vessel 110 to enable the secondary coolant 131 to passively flow through the secondary coolant circuit 130 via natural convection.

Accordingly, the secondary coolant circuit 130 is configured to direct low temperature secondary coolant 131 (e.g., 150° C.): from the external thermal power generation system; through the secondary inlet 135; though the outer secondary vertical channel 133; across the set of secondary lateral channels 134; and through the inner secondary vertical channel 132. Within the heat exchanger region between the inner and outer surfaces of the wall 111, the secondary coolant 131 absorbs thermal energy from the pressure vessel 110 and therefore the secondary coolant 131 increases in temperature. The secondary coolant circuit 130 is additionally configured to direct heated secondary coolant 131 (e.g., 250° C.): through the secondary outlet 136; and to an external thermal power generation system to release thermal energy to the external thermal power generation system to produce mechanical, chemical, or electrical work. Therefore, the secondary coolant circuit 130 transports secondary coolant 131 through the heat exchanger region of the pressure vessel 110 to: remove heat from the primary coolant circuit 120; and extract thermal energy from the nuclear reactor 140 within the pressure vessel 110.

In another variation, the secondary coolant circuit 130 is configured to direct each portion of secondary coolant 131 along a path through the secondary coolant circuit 130 defining an approximately (e.g., within 1%) constant length. For example, a first portion of secondary coolant 131 can flow: into the secondary inlet 135; three feet down the outer secondary vertical channel 133; across a set of secondary lateral channels 134 arranged three feet down the outer secondary vertical channel 133; 17 feet down the inner secondary vertical channel 132; and out of the secondary outlet 136. A second portion of secondary coolant 131 can flow: into the secondary inlet 135; eight feet down the outer secondary vertical channel 133; across a set of secondary lateral channels 134 arranged eight feet down the outer secondary vertical channel 133; 12 feet down the inner secondary vertical channel 132; and out of the secondary outlet 136. In this example, while the first portion of secondary coolant 131 and the second portion of secondary coolant 131 flow across different secondary lateral channels 134, both the first portion of secondary coolant 131 and the second portion of secondary coolant 131 complete a 22-foot total path length through the secondary coolant circuit 130. Therefore, each portion of secondary coolant 131 remains in the secondary coolant circuit 130 for approximately the same time duration and can absorb approximately the same amount of thermal energy from the pressure vessel 110.

4.3 Coolant Flow Directions

Figure 5:
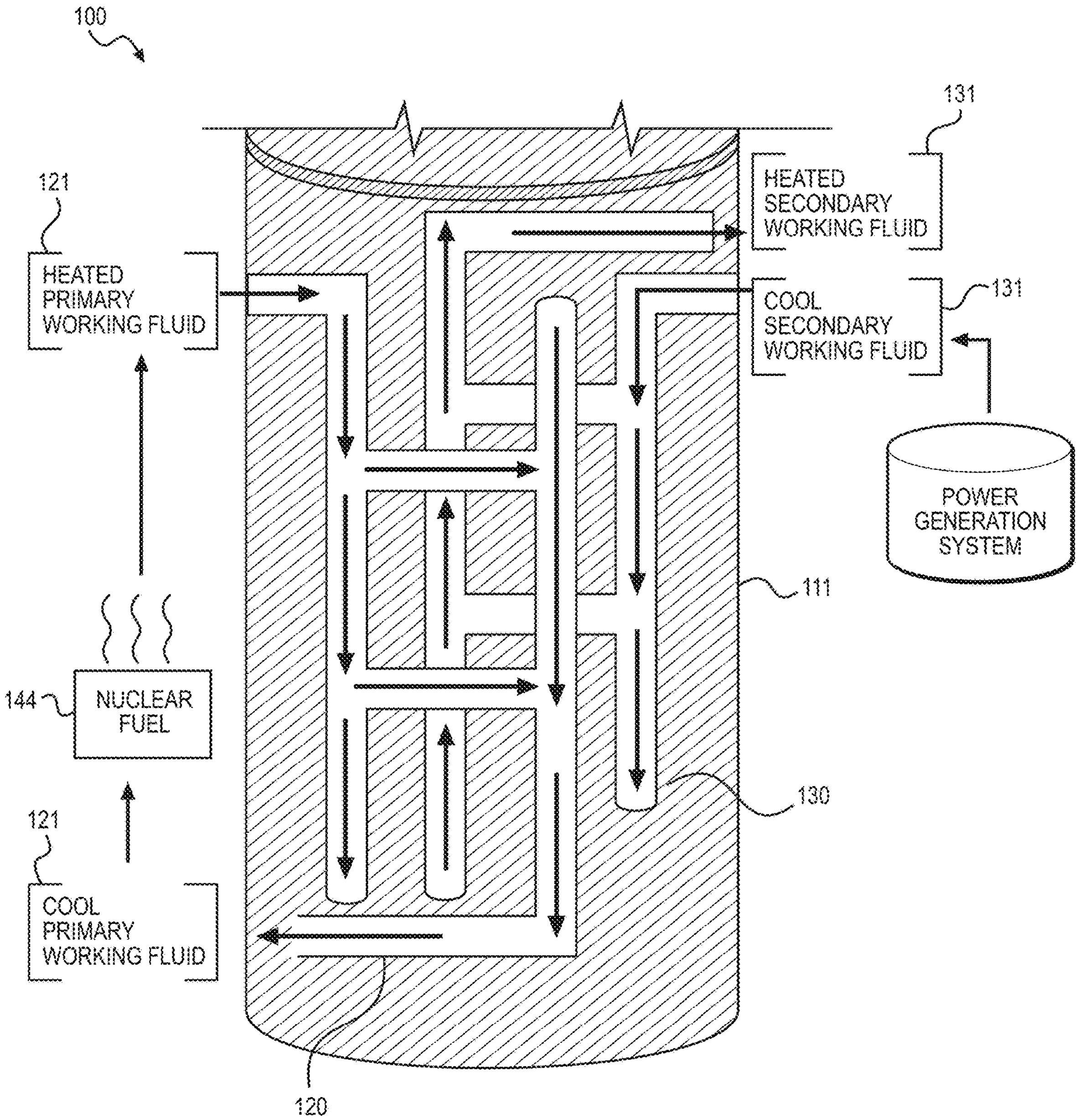
FIG. 5 is a schematic representation of one variation of the system.

Generally, the primary coolant circuit 120 directs the primary coolant 121: into the primary inlet 125; axially down the inner primary vertical channel 122; radially across the set of primary lateral channels 124; axially down the outer primary vertical channel 123; and radially across the continuous wall 111 to exit via the primary outlet 126. Therefore, the primary coolant circuit 120 is arranged to exploit natural convection such that heated primary coolant 121: rises to a top of the internal volume 114; enters the primary inlet 125; cools while sinking down the inner and outer primary vertical channels 122, 123; and flows back into the internal volume 114 via the primary outlet 126, as shown in FIG. 5.

Furthermore, the secondary inlet 135 and secondary outlet 136 are arranged within an upper region 115 of the outer surface of the pressure vessel 110. The secondary coolant circuit 130 directs the secondary coolant 131: into the secondary inlet 135; down the outer secondary vertical channel 133; across the set of secondary lateral channels 134; down the inner secondary vertical channel 132; and out of the secondary outlet 136. The secondary lateral channel 134 can additionally include an exit conduit configured to direct secondary coolant 131 from a lower region 116 of the pressure vessel 110 at the end of the inner secondary vertical channel 132 to an upper region 115 of the pressure vessel 110 to exit the outer surface via the secondary outlet 136. The secondary outlet 136 is therefore arranged to exploit natural convection such that the secondary coolant 131: enters at a low temperature at a top of the pressure vessel 110; sinks down the inner and outer secondary vertical channels 132, 133; absorbs heat from the pressure vessel 110; and rises up through the inner and outer secondary vertical channels 132, 133 toward the secondary outlet 136.

4.3.1 Coolant Flow: Natural Convection

In one implementation, the primary coolant 121 passively circulates between the nuclear fuel 144 and the primary coolant circuit 120 in a particular direction via natural convection. The secondary coolant 131 passively circulates between the secondary coolant circuit 130 and an external thermal power generation system in the particular direction, via natural convection, as shown in FIG. 5.

In one variation, the primary coolant 121: flows from the nuclear fuel 144 to an upper region 115 of the internal volume 114 in an upward direction; enters through the primary inlet 125 at the upper region 115 of the internal volume 114; flows through the primary coolant circuit 120 in a downward direction via natural convection within the pressure vessel 110; and returns back into a lower region 116 of the internal volume 114, proximal the nuclear fuel 144, via the primary outlet 126. The secondary coolant 131: enters through the secondary inlet 135 at the upper region 115 of the internal volume 114 from the external power generation system; flows through the secondary coolant circuit 130 in a downward direction; absorbs thermal energy from the primary coolant 121; and flows through the secondary coolant circuit 130 in an upward direction into the secondary outlet 136 via natural convection.

Therefore, the primary inlet 125, the primary outlet 126, the secondary inlet 135, and the secondary outlet 136 are arranged at different heights on the pressure vessel 110 to enable the primary coolant 121 and the secondary coolant 131 to passively flow through the primary coolant circuit 120 and the secondary coolant circuit 130, respectively, via natural convection.

4.3.2 Coolant Flow: Active Pumps

Figure 6:
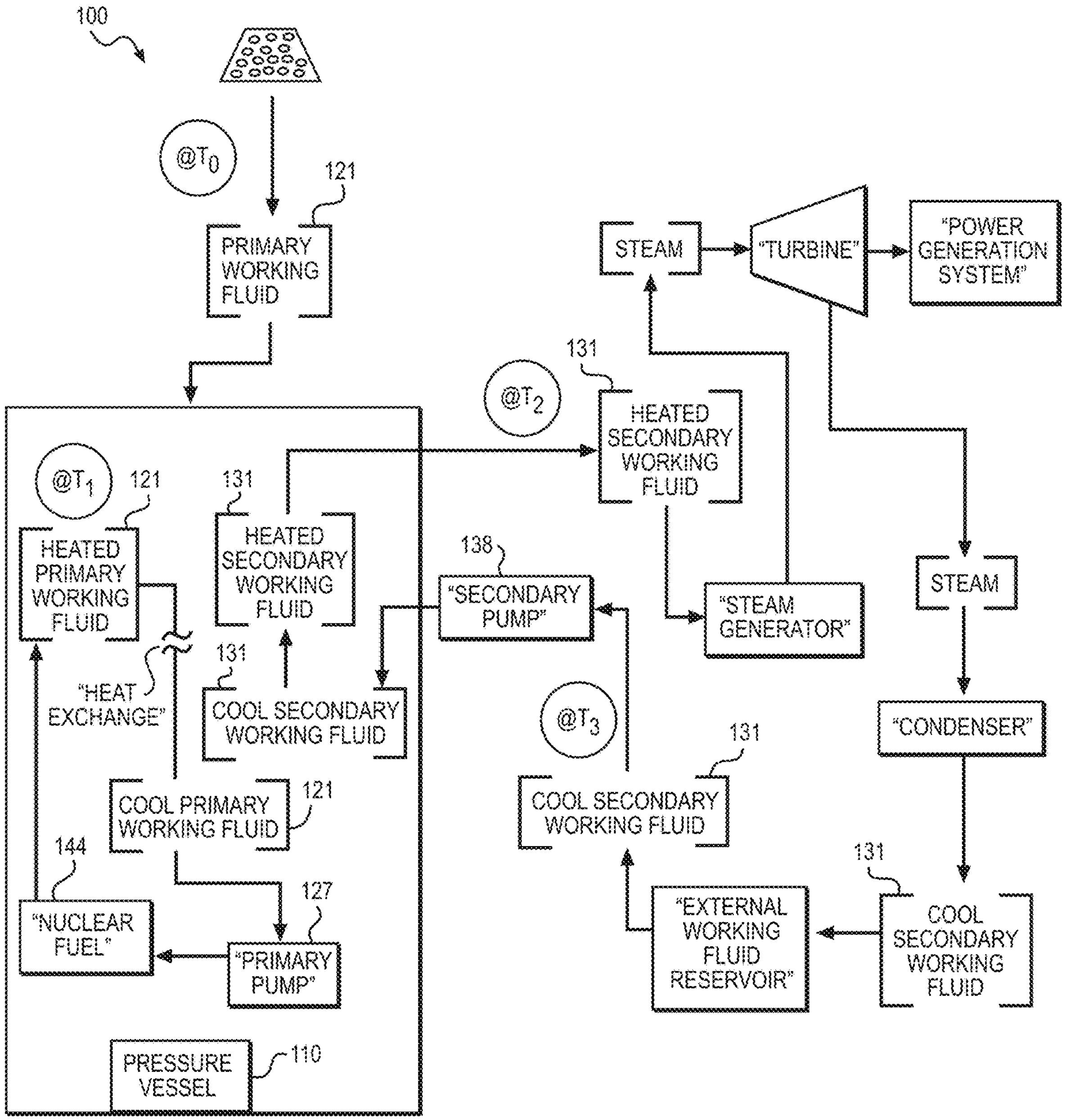
FIG. 6 is a schematic representation of one variation of the system.

In one implementation, the primary coolant circuit 120 includes a primary pump 127 configured to create a pressure gradient to actively direct the primary coolant 121 through the primary coolant circuit 120. The secondary coolant circuit 130 includes a secondary pump 138 configured to create a pressure gradient to actively direct the secondary coolant 131 through the secondary coolant circuit 130, as shown in FIG. 6.

For example, the primary coolant circuit 120 can include a primary fluid pump: arranged on the pressure vessel 110; and configured to generate a pressure gradient to drive (e.g., influence, actively direct) the primary coolant 121, from proximal the nuclear fuel 144, into the primary inlet 125, through the primary coolant circuit 120, and to the primary outlet 126. The secondary coolant circuit 130 can include a secondary fluid pump: coupled to the secondary inlet 135; and configured to generate a pressure gradient to drive the secondary coolant 131 into the secondary inlet 135, through the secondary coolant circuit 130, and toward the secondary outlet 136 to supply the secondary coolant 131, heated by the primary coolant 121 within the wall 111 of the pressure vessel 110, to the external power generation system.

However, the system 100 can include primary and secondary coolant circuits 120, 130 configured to direct flow of the primary and secondary coolants 121, 131 in any other direction.

4.4 Caps+Manifolds

The pressure vessel 110 further includes an upper cap 112 and a lower cap 113 that cooperate to seal the internal volume 114. The upper cap 112 is arranged about and coupled to the outer surface of the wall 111; defines an orifice configured to pass nuclear fuel 144 into the internal volume 114 during an installation period; and defines a sealing flange. The sealing flange is: operable in an open position to enable loading of nuclear fuel 144 into the internal volume 114 via the orifice during the installation period; and operable in a closed position to seal the orifice and the pressure vessel 110 upon termination of the installation period.

For example, the upper cap 112 can include a fuel loading port including a sealing flange configured to seal the orifice of the upper cap 112 after loading of the nuclear fuel 144. The upper cap 112 can additionally include the secondary inlet 135 and the secondary outlet 136 rather than arranging the secondary inlet 135 and the secondary outlet 136 along the outer surface. The upper cap 112 can define solid portions configured to seal the inner primary vertical channel 122, the outer primary vertical channel 123, the inner secondary vertical channel 132, and the outer secondary vertical channel 133.

The lower cap 113 is arranged proximal a base of the pressure vessel 110 and coupled to the outer surface of the wall 111 opposite the upper cap 112; and is configured to cooperate with the upper cap 112 to seal the internal volume 114, the primary coolant circuit 120, and the secondary coolant circuit 130. In one implementation, the lower cap 113 can define a solid disk configured to seal the lower end of the internal volume 114, the inner primary vertical channel 122, the outer primary vertical channel 123, the inner secondary vertical channel 132, and the outer secondary vertical channel 133. In another implementation, the lower cap 113 includes a set of orifices to connect the pressure vessel 110 to external hardware.

In another variation, the pressure vessel 110 can include a set of layers defining the structure of the pressure vessel 110. Each layer can include cutouts, aperture 156, slot 158, indentations, receptacles, and etchings that define: segments of the inner and outer primary vertical channels 122, 123; segments of the inner and outer secondary vertical channels 132, 133; the primary and secondary lateral channels 134; and the internal volume 114. For example, the wall 111 of the pressure vessel 110 defines an annular cross-section. The primary coolant circuit 120 can define: a first radial array of inner primary vertical channels 122; a second radial array of outer primary vertical channels 123; and a third radial array of primary lateral channels 124 fluidly coupling the first radial array of inner primary vertical channels 122 to the second radial array of outer primary vertical channels 123. The secondary coolant circuit 130 can define: a fourth radial array of inner secondary vertical channels 132; a fifth radial array of outer secondary vertical channels 133; and a sixth radial array of lateral secondary channels fluidly coupling the fourth radial array of inner secondary vertical channels 132 to the fifth radial array of outer secondary vertical channels 133.

Figure 2:
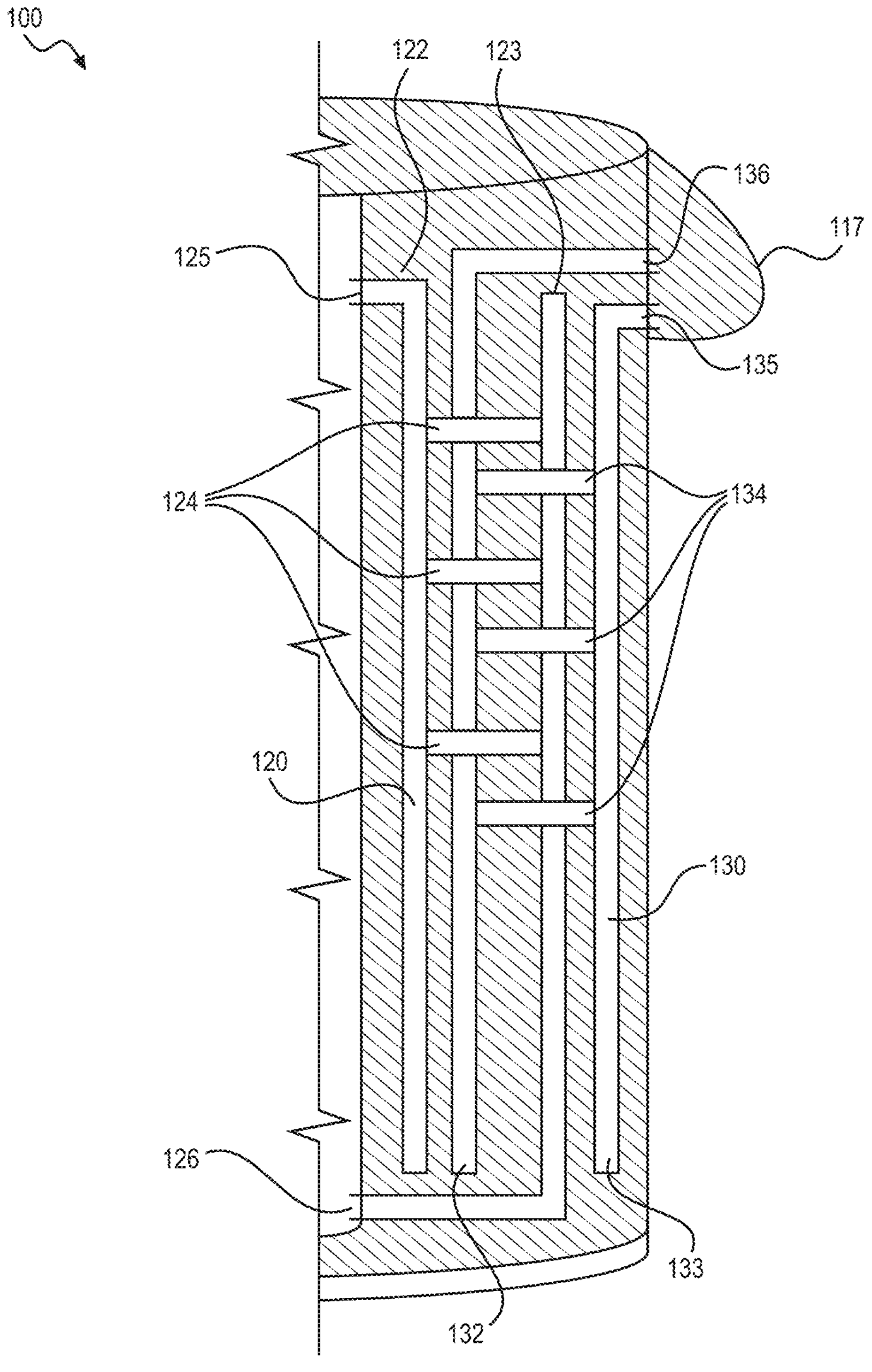
FIG. 2 is a schematic representation of one variation of the system.

Furthermore, the upper cap 112 and the lower cap 113 define coolant manifolds configured to: divide flows of coolant; and direct primary and/or secondary coolant 131 into a primary or secondary inlet 135. For example, the pressure vessel 110 can define a set of orifices: arranged about the outer surface of the wall 111; fluidly coupled to the fifth radial array of outer secondary vertical channels 133; and intersecting the outer surface of the wall 111. The system 100 can further include a toroidal manifold 117: coupled to the outer surface of the wall 111 of the pressure vessel 110 to enclose the set of orifices; and defining a secondary inlet 135 configured to intake the secondary coolant 131 from the external power generation system. The toroidal manifold 117 is configured to: circulate the secondary coolant 131 around the outer surface of the wall 111; and supply the secondary coolant 131 into the set of orifices toward the fifth radial array of outer secondary vertical channels 133, as shown in FIG. 2.

Thus, the system 100 can include a manifold coupled to a top of the pressure vessel 110 to receive and distribute secondary coolant 131 into orifices of the wall 111 rather than through a secondary inlet 135 arranged within the pressure vessel 110.

5. Nuclear Fuel+Reactor Core

The pressure vessel 110 can further include a reactor core 146 defining a column within an upper region 115 and a lower region 116 of the internal volume 114 of the pressure vessel 110. The reactor core 146 includes the primary coolant 121, a control material, and the nuclear fuel 144. The nuclear fuel 144 is arranged within the lower region 116 of the pressure vessel 110. The control material is arranged within the upper region 115 of the pressure vessel 110 and aligned with the nuclear fuel 144 along a vertical axis (e.g., a z-axis) of the pressure vessel 110. The primary coolant 121 occupies the upper region 115 and the lower region 116 of the pressure vessel 110.

In one implementation, the nuclear fuel 144 includes a fissile material such as enriched uranium-235. The fissile material is configured to undergo an exothermic fission reaction. The reactor core 146 includes a pressurized water reaction (or "PWR") in which the primary coolant 121 is pressurized to reduce movement of neutrons emitted from the nuclear fuel 144 and to increase a likelihood of neutron collision, thereby maintaining the fission reaction at a critical state. Alternatively, the nuclear fuel 144 can be solid and non-actuatable.

In another implementation, the nuclear fuel 144 is arranged as a bundle of nuclear fuel 144. In one example, the nuclear fuel 144 is aligned vertically within the lower region 116 of the pressure vessel 110 in a concentric pattern. In another example, the nuclear fuel 144 is: separated into portions; and arranged in a grid pattern. The nuclear fuel 144 portions can be evenly spaced to enable the primary coolant 121 to flow past and cool each portion of nuclear fuel 144.

In one variation, the nuclear fuel 144 includes fissile material and is configured to heat the primary coolant 121 via a fission reaction. The fissile material is housed in a set of fuel rods 148: defining a lateral pitch; and arranged in a radial pattern about a vertical axis (e.g., z-axis) of the pressure vessel 110. For example, the pressure vessel 110 can include a set of (e.g., twelve) fuel rods 148, each fuel rod 148 containing sub-5% enriched uranium-235 pellets, arranged in a grid array (e.g., 17×17 grid array) in the lower region 116 of the pressure vessel 110.

5.1 Control Rods

In one variation, the system 100 includes a set of control rods 142 extending parallel to the vertical axis (e.g., a z-axis) of the pressure vessel 110 and configured to: store a nuclear poison; and actuate, along the vertical axis of the pressure vessel 110, between an extended position (e.g., engaged position) and a retracted position (e.g., disengaged position). The set of control rods 142 transition between the retracted position in the upper region 115 of the pressure vessel 110 and the extended position in the lower region 116 of the pressure vessel 110 to moderate a fission reaction within the nuclear fuel 144.

The nuclear poison: includes enriched boron, cadmium, and/or hafnium; and is configured to absorb neutron radiation emitted by the nuclear fuel 144 via a fission reaction. However, the nuclear poison can include any other material configured to absorb neutron radiation emitted by the nuclear fuel 144.

In the extended position, the set of control rods 142 extend parallel to the vertical axis of the pressure vessel 110 from the upper region 115 into the lower region 116 to cover the nuclear fuel 144 arranged in the lower region 116 of the pressure vessel 110. In the retracted position, the set of control rods 142 retract from the lower region 116 to the upper region 115 of the pressure vessel 110 to uncover the nuclear fuel 144. The set of control rods 142 can transition between the extended position and the retracted position via a control rod drive assembly (e.g., a control rod drive mechanism) external to the pressure vessel 110.

Therefore, the set of control rods 142 can operate between the extended position and the retracted position: to cover and uncover the nuclear fuel 144; to moderate fission reactions within the nuclear fuel 144; to control the flux of neutrons in the pressure vessel 110; and cooperate with the primary coolant 121 and the secondary coolant 131 to maintain the pressure vessel 110 within an operating temperature and pressure range.

6. Diffusion-Bonded Pressure Vessel

Generally, the pressure vessel 110 includes a set of metallic plates diffusion-bonded together to define: the internal volume 114; the inner and outer primary vertical channels 122, 123; the primary lateral channels 124; the inner and outer secondary vertical channels 132, 133; and the secondary lateral channels 134. The set of metallic plates can define a stack of annuli, as shown in FIGS. 3A, 3B, and 3C, to form a cylindrical pressure vessel 110. Each metallic plate can diffusion-bond to an adjacent metallic plate to form a monolithic pressure vessel 110 defining complex interior pathways for flow of primary and secondary coolants 121, 131.

In one implementation, the pressure vessel 110 forms a monolithic structure of diffusion-bonded metallic plates. The metallic plates include: a set of primary plates 150; a set of secondary plates 152; and a set of interstitial plates 154 interposed between a primary plate 150 in the set of primary plates 150 and a secondary plate 152 in the set of secondary plates 152. The set of interstitial plates 154 are configured to isolate the primary coolant circuit 120 from the secondary coolant circuit 130.

In another implementation, the set of metallic plates include a stack of diffusion-bonded annuli or layers to define a cylindrical geometry of the pressure vessel 110. The stack of diffusion-bonded annuli or layers cooperate to define radial arrays of primary channels (e.g., vertical, lateral) of the primary coolant circuit 120 and radial arrays of secondary channels (e.g., vertical, lateral) of the secondary coolant circuit 130. Each annulus or layer can include cutouts, apertures 156, slots 158, indentations, receptacles, and etchings that define: segments of the inner and outer primary vertical channels 122, 123; segments of the inner and outer secondary vertical channels 132, 133; the primary and secondary lateral channels 134; and the internal volume 114. In one example, each metallic plate defines an annular disc characterized by a thickness of one-eighth of an inch or less. Each annular disc can include a metallic material such as stainless-steel, aluminum, or molybdenum. However, each metallic plate (e.g., primary, secondary, interstitial) can include any other type of material.

6.1 Metallic Plates

In one variation, the set of primary plates 150 defines: first segments of the inner and outer primary vertical channels 122, 123; first segments of the inner and outer secondary vertical channels 132, 133; and the set of primary lateral channels 124. The set of secondary plates defines: second segments of the inner and outer primary vertical channels 122, 123; second segments of the inner and outer secondary vertical channels 132, 133; and the set of secondary lateral channels 134. The set of interstitial plates defines: third segments of the inner and outer primary vertical channels 122, 123; and third segments of the inner and outer secondary vertical channels 132, 133.

For example, a first primary plate 150 in the set of primary plates 150 defines: a first segment of the inner primary vertical channel 122; a first segment of the outer primary vertical channel 123; a first segment of the inner secondary vertical channel 132; a first segment of the outer secondary vertical channel 133; and a first set of primary lateral channels 124 fluidly coupling the first segment of the inner primary vertical channel 122 and the first outer primary vertical channel 123. A first secondary plate 152 in the set of secondary plates 152 defines: a second segment of the inner primary vertical channel 122; a second segment of the outer primary vertical channel 123; a second segment of the inner secondary vertical channel 132; a second segment of the outer secondary vertical channel 133; and a set of secondary lateral channels 134 fluidly coupling the second segment of the second inner secondary vertical channel 132 and the second segment of the outer secondary vertical channel 133. A first interstitial plate 154 in the set of interstitial plates 154 defines: a third segment of the inner primary vertical channel 122; a third segments of the outer primary vertical channel 123; a third segment of the inner secondary vertical channel 132; and a third segment of the outer secondary vertical channel 133. The first interstitial plate 154 is interposed between and diffusion-bonded to the first primary plate 150 in the set of primary plates 150 and the first secondary plate 152 in the set of secondary plates 152.

In this example, the set of primary plates 150 defines: segments of inner and outer primary vertical channels 122, 123; segments of inner and outer secondary vertical channels 132, 133; and a first radial array of primary lateral channels 124 fluidly coupling the segments of inner and outer primary vertical channels 122, 123. The set of secondary plates 152 defines: segments of inner and outer primary vertical channels 122, 123; segments of inner and outer secondary vertical channels 132, 133; and a second radial array of primary lateral channels 124 fluidly coupling the segments of inner and outer secondary vertical channels 132, 133. The set of interstitial plates 154 cooperate with the set of primary plates 150 and the set of secondary plates 152 to define: a first radial array of inner primary vertical channels 122 arranged proximal an inner surface of the wall 111; a second radial array of outer primary vertical channels 123 arranged proximal an outer surface of the wall 111; a third radial array of inner secondary vertical channels 132 arranged proximal the inner surface of the wall 111 and isolated from the first radial array of inner primary vertical channels 122; a fourth radial array of outer secondary vertical channels 133 arranged proximal the outer surface of the wall 111 and isolated from the second radial array of outer primary vertical channels 123; and an internal volume 114 configured to contain a nuclear reactor 140.

Therefore, each interstitial plate 154 is: interposed between and diffusion-bonded to a primary plate 150 in the first set of primary plates 150 and a secondary plate 152 in the second set of secondary plates 152; and configured to separate flow of the primary coolant 121 through the primary coolant circuit 120 from flow of the secondary coolant 131 through the secondary coolant circuit 130. For example, during a primary plate 150 failure event (e.g., a primary plate cracks), the interstitial plate 154 enables constant flow of the primary coolant 121 to an adjacent secondary plate 152 without mixing with the secondary coolant 131.

6.2 Features of Metallic Plates

In another implementation, the set of metallic plates includes a stack of diffusion-bonded metallic plates (e.g., annuli, layers) to define a cylindrical geometry of the pressure vessel 110. The stack of diffusion-bonded metallic plates cooperates to define radial arrays of primary channels (e.g., vertical, lateral) of the primary coolant circuit 120 and radial arrays of secondary channels (e.g., vertical, lateral) of the secondary coolant circuit 130. Each metallic plate further defines a group of features (e.g., cutouts, apertures 156, slots 158, indentations, receptacles, etchings) that defines: segments of the inner and outer primary vertical channels 122, 123; segments of the inner and outer secondary vertical channels 132, 133; the primary and secondary lateral channels 134; and the internal volume 114, as shown in FIGS. 3A, 3B, and 3C.

Figure 4A:
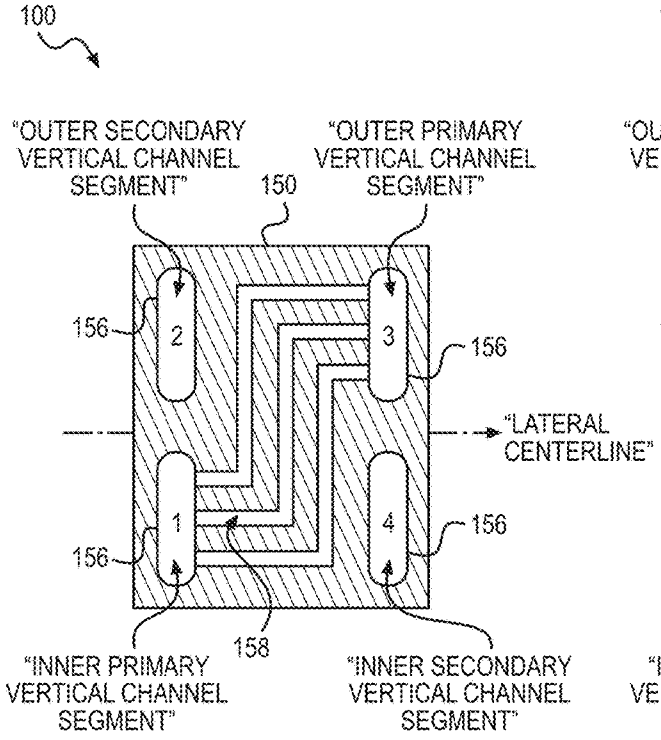
FIGS. 4A, 4B, and 4C are schematic representations of one variation of the system.
Figure 4B:
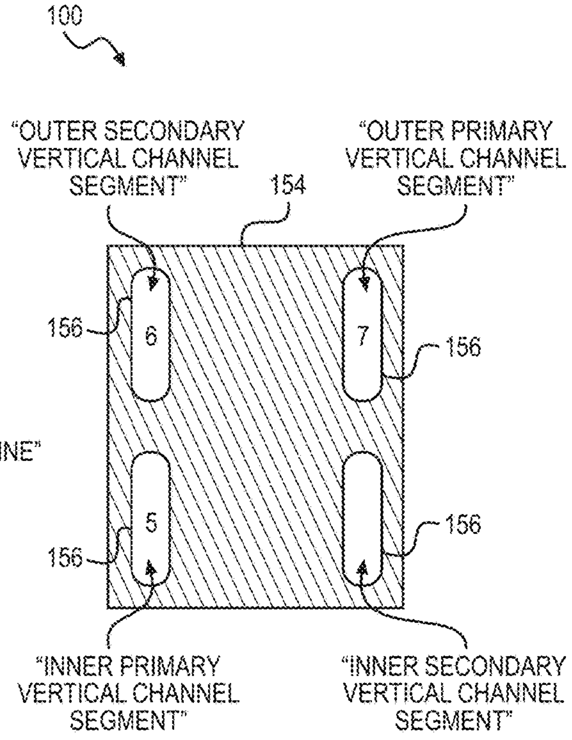
Figure 4C:
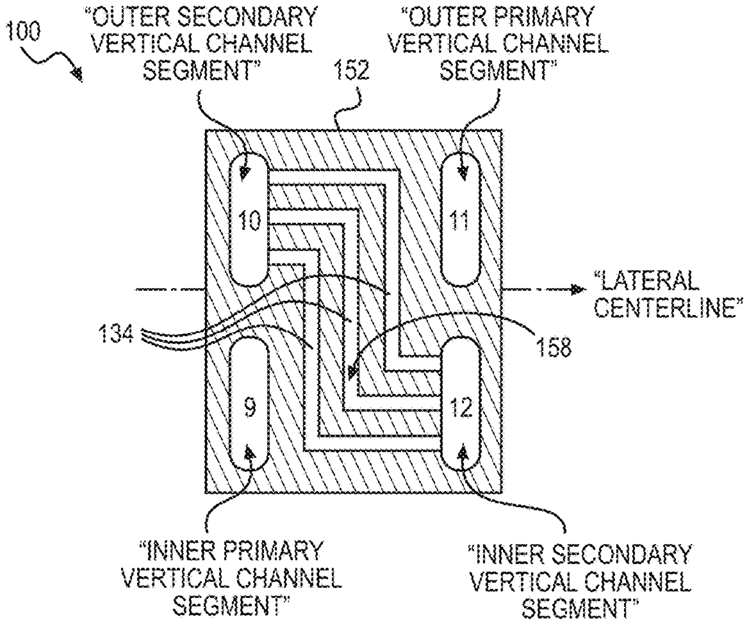

In one variation, the wall 111 of the pressure vessel 110 defines a cylindrical geometry and is characterized by a unitary metallic structure formed of a stack of metallic plates. Adjacent interfaces of metallic plates in the stack of metallic plates are diffusion-bonded to form the unitary metallic structure. The stack of metallic plates includes: a first metallic plate defining a first set of apertures 156 and a first slot 158 extending between the first set of apertures 156 to define a first primary lateral channel 124 in the set of primary lateral channels 124; a second metallic plate defining a second set of apertures 156 aligned with the first set of apertures 156 and a second slot 158 extending between the second set of apertures 156 to define a first secondary lateral channel 134 in the set of lateral secondary channels; and a third metallic plate interposed between the first metallic plate and the second metallic plate and configured to isolate the primary coolant circuit 120 from the secondary coolant circuit 130, as shown in FIGS. 4A, 4B, and 4C.

For example, the set of metallic plates can include a primary plate 150, a secondary plate 152, and an interstitial plate 154 diffusion-bonded together to form an annular stack. A first set of apertures 156 of the primary plate 150 includes: a first aperture 156 arranged in a first quadrant of the annular stack; a second aperture 156 arranged in a second quadrant of the annular stack; a third aperture 156 arranged in a third quadrant of the annular stack; and a fourth aperture 156 arranged in a fourth quadrant of the annular stack. The first slot 158 extends between the first aperture 156 in the first quadrant and the third aperture 156 in the third quadrant to define the first primary lateral channel 124 in the set of primary lateral channels 124.

The interstitial plate 154 further defines: a fifth aperture 156 aligned with the first aperture 156; a sixth aperture 156 aligned with the second aperture 156; a seventh aperture 156 aligned with the third aperture 156; and an eighth aperture 156 aligned with the fourth aperture 156.

The second set of apertures 156 of the secondary plate 152 includes: a ninth aperture 156 aligned with the first aperture 156 and the fifth aperture 156 in the first quadrant and cooperating with the fifth aperture 156 and the ninth aperture 156 to form segments of the inner primary vertical channel 122; a tenth aperture 156 aligned with the second aperture 156 and the sixth aperture 156 in the second quadrant and cooperating with the second aperture 156 and the sixth aperture 156 to form segments of the outer secondary vertical channel 123; an eleventh aperture 156 aligned with the third aperture 156 and the seventh aperture 156 in the third quadrant and cooperating with the third aperture 156 and the seventh aperture 156 to form segments of the outer primary vertical channel 133; and a twelfth aperture 156 aligned with the fourth aperture 156 and the eighth aperture 156 in the fourth quadrant and cooperating with the fourth aperture 156 and the eighth aperture 156 to form segments of the inner secondary vertical channel 132. The second slot 158 extends between the tenth aperture 156 in the second quadrant and the twelfth aperture 156 in the fourth quadrant to define the first secondary lateral channel 134 in the set of lateral secondary channels.

Therefore, each metallic plate in a set of metallic plates can include a group of features (e.g., cutouts, aperture 156, slot 158, indentations, receptacles, etchings) that define: segments of the inner and outer primary vertical channels 122, 123; segments of the inner and outer secondary vertical channels 132, 133; the internal volume 114; and/or primary and secondary lateral channels 124, 134. The set of metallic plates can be diffusion-bonded across interfaces between adjacent metallic plates in the stack of metallic plates: to form the unitary metallic structure of the pressure vessel 110; to define primary channels (e.g., primary vertical channels 122, 123, primary lateral channels 124) of the primary coolant circuit 120; and to define secondary channels (e.g., secondary vertical channels 132, 133, secondary lateral channels 134) of the secondary coolant circuit 130, as further described below.

7. Manufacturing+Assembly

Generally, the pressure vessel 110 is formed by photochemical etching of a set of metallic plates for an exposure duration to define the primary coolant circuit 120 and the secondary coolant circuit 130 in the set of metallic plates. The pressure vessel 110 is further formed by, during a diffusion bonding cycle: heating the set of metallic plates within the vacuum chamber to a target bonding temperature—corresponding to a material (e.g., stainless steel, aluminum, molybdenum) of the set of metallic plates—for a target duration; and applying external pressure to the set of metallic plates within the vacuum chamber for the target duration to diffusion-bond adjacent interfaces of metallic plates in the set of metallic plates and to form a monolithic structure defining the wall 111, the primary coolant circuit 120, and the secondary coolant circuit 130.

Thus, each plate of the diffusion-bonded pressure vessel 110 is manufactured to form the wall 111 defining: primary channels; secondary channels; primary lateral channels 124; and secondary lateral channels 134.

7.1 Plate Manufacturing

In one implementation, each plate can include a set of partial depth cuts defining the lateral channels between the vertical channels. The partial depth cuts may be manufactured such as via photochemical etching or partial-depth laser etching. For example, each lateral channel between the vertical channels can be formed via photochemical etching to selectively remove portions of metal from each plate via a chemical reagent or etchant. In this implementation, the dimensions (e.g., width and depth) of each channel are controlled by varying an exposure duration of the metal plate to the chemical reagent. Further, the metal plate exposed to the chemical reagent for one hour may exhibit three-millimeter-deep etched channels, while a metal plate exposed to the chemical reagent for ten minutes may exhibit one-millimeter-deep channels.

In another implementation, each conduit and/or channel is formed via full depth cutting, such as via laser cutting or waterjet cutting. For example, the cut the conduits, a laser or waterjet is directed at a sheet metal plate to ablate material from the plate (e.g., ablating through the fill depth of the material), thereby cutting vertical channel segments and forming channels. In one example, the laser or waterjet power is modulated to vary a depth of ablation of the sheet metal plate including: a high-power stage to cut through the sheet metal to remove material for the vertical channel segment; and a low power stage to ablate a partial depth of the plate to form a channel indentation.

In another implementation, each lateral and vertical channel is formed via punching or stamping. In this implementation, a die defining each lateral and vertical channel is pressed against a blank sheet metal plate to emboss and form of the lateral or vertical channel on the plate. In one example, the die is used to punch out material from the sheet metal plate, such as to form a vertical channel segment. In another example, the die is used to stamp indentations into the sheet metal plate to define the lateral and vertical channels.

7.2 Plate Geometry

In one implementation, the pressure vessel 110 exhibiting a cylindrical geometry is formed via diffusion bonding of a stack of annular plates. The stack of annular plates can include: a primary plate 150 defining primary lateral channels 124; a secondary plate 152 defining secondary lateral channels 134; and interstitial plates 154 that seal the primary lateral channels 124 from the secondary lateral channels 134. In one implementation, each plate can define a thickness of one-eighth of an inch. Therefore, a 20-foot-long pressure vessel 110 includes approximately two thousand plates within the stack of plates. During a diffusion-bonding cycle, the stack of plates—occupying a vacuum chamber—is loaded with pressure (e.g., uniaxial pressure parallel to the vertical axis of the pressure vessel 110) and heated for a bonding duration to form the cylindrical pressure vessel 110.

In one implementation, each plate can include a set of arcuate sections wherein the set of arcuate sections (e.g., keystones) can be aligned to form an annular plate of the pressure vessel 110. In this implementation, the pressure vessel 110 can be formed by diffusion bonding a stack of arcuate sections into an arcuate pillar (e.g., for a 20-foot-long pressure vessel 110, the arcuate pillar can define a 20-foot-long pillar including a 30° segment of an annulus) via uniaxial pressure along the axis of the pillar. The set of arcuate pillars (e.g., 12 pillars each 30° wide) can then be diffusion-bonded to form the cylindrical geometry by loading the set of pillars with a uniform radial pressure, thereby squeezing the set of arcuate pillars into a cylinder. Therefore, the pressure vessel 110 can be manufactured in subsections (e.g., pillars or short cylindrical stacks including subsets of the annular plate) and those subsections are then diffusion-bonded together.

However, the plates defining the pressure vessel 110 can be bonded into a monolithic structure via any other manufacturing process.

7.3 Plate Preparation

Prior to diffusion bonding the set of plates, each plate of the set of plates undergoes a preparation process including: cleaning; and polishing. During cleaning of a plate, the plate is exposed to (e.g., coated with, submerged in, wiped with) a chemical reagent to remove oils, particulates, and oxidation from both surfaces of the plate. During polishing of a plate, the plate is polished (e.g., mechanically, chemically, or electrolytically) to achieve a target finish grade. For example, each plate is polished to a "roughness average" (or Ra) of 5 to achieve a mirror finish.

7.4 Pressure Vessel Manufacturing from Plates

Generally, the set of plates are heated to an elevated temperature range (below the melting temperature of the plate material) and pressed together within a vacuum chamber to diffusion bond the set of plates to form the pressure vessel 110.

In particular, when two adjacent plates occupy the elevated temperature range—such as between 50% and 90% of the melting temperature of the base material of the plates—asperities (e.g., uneven surface features) of adjacent surfaces of each plate contact each other and exhibit deformation. During this stage, grain boundaries of each metal plate deform and grains—at the boundary between the surfaces—can interlink to form interfaces across the boundary. As temperature increases and pressure is applied in a direction normal to the boundary of the plates, metallic grains of each plate can migrate to fill in gaps between the two surfaces. During this elevated temperature and pressure stage, irregularities in the surfaces of each plate are reduced to isolated pores or filled in by migrating grains. After grain migration, the grains grow across the boundary between the two plates, thereby resulting in cross-boundary crystalline growth. The cross-boundary crystalline growth of the metal grains causes diffusion of each plate into the adjacent plate, therefore blending the material boundary and forming a bond.

During the diffusion bonding process, gaps between the plates caused by surface imperfections (e.g., dents, scratches, surface-oxidation) of the plates can result in occlusions of gas between the plates. Additionally, any impurities and particulate matter trapped between the plates can cause inclusions. Metallic boundaries cannot migrate past inclusions and occlusions, which results in an area of weak bonding between the plates around the inclusion or occlusion. Therefore, the diffusion bonding process of the set of plates can be executed within a filtered vacuum chamber to evacuate gases between the plates and reduce incidence of particulate inclusions, thereby strengthening the bond between each plate.

Via diffusion bonding, the set of plates form a monolithic pressure vessel 110 structure exhibiting sufficient bond strength between adjacent plates to: maintain isolation of the primary and secondary coolants 121, 131 flowing through the primary vertical channels 122, 123 and the secondary vertical channels 132, 133; prevent egress of the primary and secondary coolants 121, 131 from the pressure vessel 110; prevent ingress of debris into the pressure vessel 110 and nuclear reactor 140; and contain the primary and secondary coolants 121, 131 under operating pressures within the primary and secondary coolant circuits 120, 130. For example, a bond between two adjacent plates can be continuous around primary vertical channel segments, secondary vertical channel segments, and/or channel segments of these plates. The plates can further be pressed and heated under sufficient pressure and temperature for sufficient time during the diffusion bonding process to reduce or eliminate porosities and boundaries between these plates, thereby forming a continuous metallic volume within the pressure vessel 110 that prevent egress of radiation from the system.

Therefore, the diffusion bonded pressure vessel 110 can define a monolithic structure able to contain the primary and secondary coolants 121, 131 at nominal working temperatures and pressures, such as up to 10,000 psi. Furthermore, by diffusion bonding plates to form the pressure vessel 110, the pressure vessel 110 can define complex internal geometries that form continuous and isolated primary and secondary coolant circuits 120, 130.

7.5 Alternative Pressure Vessel Manufacturing Processes

Alternatively, the pressure vessel 110 can be manufactured via other processes such as: investment casting; sand casting; or metal-3D printing.

Similarly, individual plates—containing multiple rows of coolant channels—can be manufactured via other processes such as investment casting, sand casting, or metal-3D printing. Faces of these individual plates can then be ground, polished, cleaned, and aligned before assembly by diffusion bonding, as described above.

8. Additional Integrations

In one implementation, the pressure vessel 110 can include additional components integrated within the continuous wall 111 and/or the internal volume 114.

In one implementation, each plate of the set of plates forming the diffusion-bonded pressure vessel 110 can include an electrical channel configured to align with an electrical channel of an adjacent plate. Once the diffusion-bonded pressure vessel 110 is assembled, the electrical channels define a void configured to receive a conductive material to form an electrical circuit within the continuous wall 111. For example, after diffusion bonding of the pressure vessel 110, molten copper is poured into the electrical channel. Once cooled, the copper within the electrical channel defines a wire. The wire can connect to a power source outside of the pressure vessel 110 and direct current to a load inside the pressure vessel 110 (e.g., a pump, pressure sensor, temperature sensor). Therefore, the diffusion-bonded pressure vessel 110 can direct electricity into and out of the sealed vessel to power integrated components.

In one implementation, the primary and secondary coolant circuits 120, 130 include electric pumps configured to induce a pressure gradient within the coolant circuit to pump coolant through the circuit. For example, the primary coolant circuit 120 can include a pump proximal the primary outlet 126 where the coolant occupies a low temperature (e.g., 250° C.) to prevent fatigue of the pump by high temperature (e.g., 350° C.) coolant flow. The secondary coolant circuit 130 can include a pump external the pressure vessel 110, such as between the external thermal power generation system and the secondary inlet 135, to similarly limit contact by the pump with high temperature (e.g., 250° C.) secondary coolant 131.

The primary and secondary coolant circuits 120, 130 can additionally include one-way valves to moderate the flow of coolant trough the conduits and channels. The primary and secondary coolant circuits 120, 130 are configured to direct coolant in one direction to exchange thermal energy with the pressure vessel 110. To maintain a desired direction of coolant flow, the conduits and channels can include one-way valves configured to direct flow in the desired direction (e.g., axially down the inner primary vertical channel 122). For example, the set of primary and/or secondary lateral channels 134 can include a geometric valve such as a Tesla valve to increase turbulence of flow in once direction and maintain flow in the desired direction.

9. Reactor Operation: Power Generation

In one implementation, the system 100 is operable as a pressurized water reactor to output secondary coolant 131 containing thermal energy, transferred from primary coolant 121 by the heat exchanger, to an external thermal power generation system. The primary coolant 121, such as low-temperature water, enters the pressure vessel 110 through the primary inlet 125 and flows over the nuclear fuel 144 to cool the nuclear fuel 144 and moderate the fission chain reaction. The nuclear fuel 144 transfers heat to the water and the heated water flows through the primary coolant circuit 120. The heat exchanger then transfers thermal energy from the primary coolant 121 into the secondary coolant 131 flowing through the secondary coolant circuit 130. The heated secondary coolant 131 then exits the pressure vessel 110 via a secondary outlet 136 toward an external thermal power generation system for conversion of thermal energy into electricity, as shown in FIG. 6.

The nuclear reactor 140 can output steam or high temperature water to a steam generator for conversion into electrical energy. In one implementation, the steam generator is external to the pressure vessel 110. The steam generator converts thermal energy, absorbed from the heated coolant output by the pressure vessel 110, into steam. The steam generator can transfer the steam to a downstream turbine. The turbine generates electricity from mechanical energy caused by the steam passing through the turbine and moving a turbine blade.

In another implementation, the system 100 is operable as a pressurized water reactor to output secondary coolant 131 containing thermal energy, transferred from primary coolant 121 by the heat exchanger, to a heat sink. The primary coolant 121, such as low-temperature water, enters the pressure vessel 110 through the primary inlet 125 and flows over the nuclear fuel 144 to cool the nuclear fuel 144 and moderate the fission chain reaction. The nuclear fuel 144 transfers heat to the water and the heated water flows through the primary coolant circuit 120. The heat exchanger then transfers thermal energy from the primary coolant 121 into the secondary coolant 131 flowing through the secondary coolant circuit 130. The heated secondary coolant 131 then exits the pressure vessel 110 via a secondary outlet 136 toward an external heat sink for conversion of thermal energy into mechanical, chemical, or electrical energy.

As a person skilled in the art will recognize from the previous detailed description and from the figures and claims, modifications and changes can be made to the embodiments of the invention without departing from the scope of this invention as defined in the following claims.

We claim:

1. A system comprising:
- a pressure vessel:
  - comprising:
    - a wall;
    - an internal volume;
  - defining a primary working fluid circuit:
    - extending vertically within the wall; and
    - comprising:
      - a first array of inner primary vertical channels;
      - a second array of outer primary vertical channels; and
      - a third array of primary lateral channels fluidly coupling the first array of inner primary vertical channels to the second array of outer primary vertical channels; and
  - defining a secondary working fluid circuit:
    - extending vertically within the wall;
    - adjacent and fluidly isolated from the primary working fluid circuit; and
    - comprising:
      - a fourth array of inner secondary vertical channels;
      - a fifth array of outer secondary vertical channels; and
      - a sixth array of secondary lateral channels fluidly coupling the fourth array of inner secondary vertical channels to the fifth array of outer secondary vertical channels;
- a nuclear fuel arranged within the interval volume of the pressure vessel;
- a primary working fluid:
  - sealed within the pressure vessel; and
  - configured to:
    - be heated by the nuclear fuel; and
    - circulate from the internal volume, through the primary working fluid circuit, to the internal volume; and
- a secondary working fluid:
  - configured to circulate between the secondary working fluid circuit, within the wall of the pressure vessel, and an external power generation system; and
  - isolated from the primary working fluid;
- wherein the wall:
  - transfers thermal energy from the primary working fluid flowing through the primary working fluid circuit into the secondary working fluid flowing through the secondary working fluid circuit;
  - encapsulates the nuclear fuel and the primary working fluid; and
  - defines a radiation shield configured to attenuate radiation emitted by the nuclear fuel.

* * * * *